UNITED STATES PATENT OFFICE.

MYRON H. CLARK, OF HASTINGS-UPON-HUDSON, NEW YORK.

MARKING RUBBER ARTICLES.

1,161,614.      Specification of Letters Patent.      Patented Nov. 23, 1915.

No Drawing.      Application filed July 26, 1915. Serial No. 41,872.

*To all whom it may concern:*

Be it known that I, MYRON H. CLARK, a citizen of the United States, residing at Hastings-upon-Hudson, Westchester county, New York, have invented certain new and useful Improvements in Marking Rubber Articles; and I do hereby declare the following to be a full, clear, and exact description of the invention, such as will enable others skilled in the art to which it appertains to make and use the same.

This invention relates to the production of permanent and integral marks in vulcanized rubber, and it comprises both a novel method of marking rubber and of producing such permanent and integral marks therein, and the novel permanently and integrally marked rubber products resulting from such method.

The marking of rubber is commonly effected by stamping or painting on the finished rubber article with a suitable ink or paint. Such marks, however, are not permanent, and soon wear off or become obliterated.

The production of a satisfactory integral and permanent mark has heretofore, so far as I am aware, been effected at the time the rubber article is itself molded, the mark or impression in such cases forming a surface of the mold, and the marking operation continuing during the molding and vulcanization.

The branding of cattle, and of wood, leather, and similar material, on the other hand, has commonly been effected by the use of branding irons heated to temperatures sufficient to char or destroy the surface layer of the material branded. Such branding operations are accompanied with actual destruction and loss of the material branded and with permanent mutilation or disfiguration.

The novel marking method of the present invention is distinguished from such branding and marking operations heretofore commonly practised, in that it does not cause any objectionable destruction or loss of the rubber; nor does it involve forming the mark in the rubber article during molding and vulcanization; while it nevertheless results in giving the rubber articles a permanent and integral mark, which cannot be obliterated or removed without actual destruction of the rubber itself.

Rubber, in a partially vulcanized state, that is to say, rubber which is not fully vulcanized up to the point of being hard rubber, can be softened and changed in form by the proper application of heat and pressure for a suitable period of time. If the temperature is too high, or is continued too long, such heating is injurious, tending to break down the structure of the rubber. Moreover, continued heating, even at the vulcanization temperatures, results in a further combination between the rubber and the excess sulfur present, and a consequent further vulcanization of the already vulcanized article.

The production of permanent and integral marks according to the present invention is based upon the property of rubber of softening and flowing under the influence of heat and pressure, but it is distinguished from procedures which involve molding or change in form or softening of the complete rubber body in that it involves heating of the rubber locally to a temperature much higher than the usual temperature of vulcanization, for a brief period of time, and thereby softening the rubber only where in contact with and heated by the marking die or heated marking surface or projections thereof, without affecting injuriously the main body of the rubber.

The method of the present invention is generally applicable to the marking and ornamentation of soft vulcanized rubber goods, including the common rubber manufactures such as boots and shoes, hose, belting, tires, and various other manufactures made of vulcanized rubber.

In practising the method of the present invention, the marking surface and projections of the die are heated to a temperature sufficient to soften the rubber, and are then firmly pressed into the rubber surface. Considerable pressure is usually necessary. By the use of a suitably high temperature and pressure, and by maintaining the die in marking or impressing position, the rubber will flow away from the high points or projections of the die, thus leaving a permanent and integral mark upon the goods.

The temperature to which the marking projections or surface of the die are heated will vary with different grades and qualities of rubber, as well as with the thickness of the article, the nature of the mixings, etc. This temperature should be sufficient to cause the softening and flowing of the rubber under pressure, but should be below that which will permanently injure and destroy the rubber. For rubber articles such as the soles of rubbers and overshoes, etc. a temperature of about 550–600° F. has been found suitable. The pressure can also be varied, depending upon the nature of the rubber article, its size and thickness, etc. This pressure should be sufficient to effect the desired flow of the rubber away from the high points or projections of the die. A considerable pressure is usually necessary for this purpose, as distinguished from the operation of branding wood, cattle and the like, where practically no pressure is used and where a simple heating and burning of the surface of the wood or hide is the end sought. I have obtained good results with pressures of 5 to 15 or 30 pounds, per square inch.

The time required for the marking operation is that which will soften the rubber and cause it to flow where in contact with the marking die, and thereby effect the desired permanent impression. Only a few seconds are usually necessary, e. g., five seconds. The marking die should not be maintained in contact with the rubber for any considerable period of time, since, at the temperatures utilized, there is danger of injury to the rubber by prolonged heating.

In order to protect the rubber during the marking, it may with advantage be coated with paraffin or other oil or wax or mineral compound, such as ozokerite; or such oils may be incorporated in the rubber itself during its production and thus exert a protecting action; or such oils can be used both in the mix itself and as a surface coating before the branding. These oil or wax coatings, with which whiting or other suitable material may be incorporated, form a protective film or layer between the marking die and the rubber, preventing the marking surface from adhering to the rubber during and after the marking operation, and assisting in giving a smooth and finished appearance to the marked article. The marking surface of the die, at the temperatures used, which are usually much higher than those of vulcanization, would tend to cause a permanent softening and decomposition of the rubber if kept in compressing position too long, and particularly if used on unprotected rubber articles.

Some slight decomposition may take place incident to the softening and flowing of the rubber during the marking operation, but such decomposition is undesirable and should be avoided as much as possible. To this end, the temperature of the marking surface and projections of the die should be kept below that of objectionable decomposition, or a protective coating or layer should be used.

With white stock, made of pure rubber and sulfur in a soft vulcanized state, and to some extent also with colored stock, the marking operation gives a pleasing coloration to the rubber, due probably to some change in the state of the sulfur, but this coloration usually fades in a short time and disappears in the course of a few weeks. When the marking operation is properly carried out, there is no objectionable charring of the rubber article.

The marking die may be of any suitable material and construction, and heated in any suitable manner. It may, for example, be of iron or other metal, and suitably heated by electricity, although other methods of heating are available. The die need be heated only at the marking surface and marking projections. It will of course be understood that the size and shape of the die, as well as its construction, and the form and design of the marking surface and projections, can be varied as desired, many different sizes and designs being used for different purposes and on different kinds of articles.

The die may be itself portable and manually applied, or it may better in practice be applied mechanically with a predetermined pressure. It can be made either as a movable die and periodically impressed upon the articles to be marked, or it can be made as a stationary part of a mechanism and the rubber articles themselves impressed upon the die. The articles to be marked can be fed intermittently to the marking die, heated to the proper temperature, and then automatically impressed with the die, or upon the die, with the necessary pressure, and for the proper time, the feed of the articles being made automatic, and the procedure continuous. In such cases the marking surface and projections of the die must be continually heated and maintained at the desired temperature, electrically or otherwise. Since articles of the same kind, e. g., rubber shoes or overshoes, are made of the same general stock, the conditions of marking can be kept constant during the marking operation.

With the purer grades of rubber made of rubber and sulfur, somewhat higher temperatures may be necessary than with articles containing considerable amounts of cheaper stock and fillers. With rubber articles containing considerable amounts of mineral fillers or compounding materials, a higher pressure may similarly be advantageous, particularly in the case of rubber articles having hardened surfaces.

The marks or impressions made in the rubber according to the present invention are distinguished from marks or impressions molded and vulcanized in the rubber surface, in that the rubber is not of a homogeneous molded and vulcanized nature, but has its surface layer modified where acted upon by the die and where the softening and flowing of the rubber has taken place. The marked articles of the present invention are accordingly characterized by a marked surface of this nature, and are thus distinguished from articles marked by other procedures, such as those referred to.

The marks produced according to the present invention can be made to present a contrasting appearance, with respect to the surface in which they are impressed. That is to say, the surface of the mark or impression can be made dull or roughened or otherwise distinguished from the smooth unmarked rubber surface, and the mark or impression can furthermore be coated or filled with a contrasting material.

From the above description it will be seen that the invention is of general application to the marking of already vulcanized rubber goods, capable of being softened and of flowing under the influence of heat and pressure, and it will accordingly be understood that variations and modifications can be made in the specific embodiments described, without departing from its spirit and scope, as set forth in the accompanying claims.

What I claim is:

1. The process of producing a permanent and integral mark in vulcanized rubber articles, which comprises impressing the marking projections of a die into the surface of the already-vulcanized rubber, such projections being heated to a temperature at which the rubber is softened, and maintaining the die in impressing position with a sufficient pressure and for a sufficient time to cause the rubber to flow and thereby effect the desired permanent impression therein; substantially as described.

2. The process of producing a permanent and integral mark in vulcanized rubber articles, which comprises impressing the marking projections of a die into the surface of the already-vulcanized rubber, such projections being heated to a temperature of about 550 to 600° F., and maintaining the die in impressing position for a few seconds time with a sufficient pressure to cause the rubber to flow and thereby effect the desired permanent impression therein; substantially as described.

3. The process of producing a permanent and integral mark in vulcanized rubber articles, which comprises coating the rubber with a suitable protective oil or wax, impressing the marking projections of a die into the surface of the already-vulcanized rubber, such projections being heated to a temperature at which the rubber is softened, and maintaining the die in impression position with a sufficient pressure and for a sufficient time to cause the rubber to flow and thereby effect the desired permanent impression therein; substantially as described.

4. The process of producing a permanent and integral mark in vulcanized rubber articles, which comprises incorporating an oil or wax with the rubber to be marked before vulcanization, impressing the marking projections of a die into the surface of the rubber after vulcanization, such projections being heated to a temperature at which the rubber is softened, and maintaining the die in impressing position with a sufficient pressure and for a sufficient time to cause the rubber to flow and thereby effect the desired permanent impression therein; substantially as described.

5. The process of producing a permanent and integral mark in vulcanized rubber articles, which comprises incorporating an oil or wax with the rubber to be marked before vulcanization, coating the rubber with a further amount of oil or wax, impressing the marking projections of a die into the surface of the rubber after vulcanization, such projections being heated to a temperature at which the rubber is softened, and maintaining the die in impressing position with a sufficient pressure and for a sufficient time to cause the rubber to flow and thereby effect the desired permanent impression therein; substantially as described.

6. A vulcanized rubber article having a permanent and integral mark therein, such mark being formed by softening and flowing of the surface layer of the rubber after vulcanization under the impressing influence of the marking projections of a heated die, and the marked surface of said article having the characteristics resulting from such treatment; substantially as described.

In testimony whereof I affix my signature.
MYRON H. CLARK.